UNITED STATES PATENT OFFICE 2,318,787

PREPARATION OF COPPER PHTHALOCYANINES

Harold Talbot Lacey, Plainfield, N. J., assignor to American Cyanamid Company, New York, N. Y., a corporation of Maine No Drawing. Application February 28, 1941, Serial No. 381,136

9 Claims. (Cl. 260—314)

This invention relates to an improved process of producing pigments of the copper phthalocyanine series from aromatic o-dinitriles.

Many processes have been proposed for producing copper phthalocyanine pigments from aromatic o-dinitriles. The problem is not a simple one. The reaction is highly exothermic and difficulties are encountered when no solvent or diluent is used. When copper halides are used with a diluent only a portion of the copper is utilized in actually forming a halogen-free pigment, part of it being employed to react with halogen set free. This will be shown by consideration of the standard reaction according to the prior are for producing copper phthalocyanines by a reaction of phthalonitrile and cuprous chloride at temperatures under 180° C. The reaction proceeds as follows:

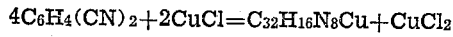

It will be noted that 100% excess of cuprous chloride is used over that necessary to supply the amount of copper actually entering into the pigment molecule. The second molecule of cuprous chloride performs the function of a chlorine acceptor. At higher temperatures the cupric chloride formed also reacts and in this case the pigment itself acts as the chlorine acceptor and chlorinated pigments are produced. In fact, in the past it has not been possible to produce an unchlorinated pigment using cupric chloride as the only cupriferous agent.

In my copending application Serial No. 299,262 filed October 13, 1939, I have described a process in which phthalonitrile or a similar aromatic o-dinitrile is reacted with cupric chloride in an inert organic solvent and in the presence of sufficient ammonia so that the ammonia reacts with the chlorine set free in the reaction, part of the ammonia being oxidized to nitrogen and hence reducing chlorine to hydrogen chloride which then reacts with the rest of the ammonia to form ammonium chloride. This was the first successful process using cupric halides to produce a halogen-free copper phthalocyanine pigment. In spite of the excellent yields from phthalonitrile and complete utilization of the copper, it is open to a technical disadvantage. The reaction mixture is corrosive and therefore the reaction had to be carried out in an enameled vessel increasing the cost of equipment quite considerably.

According to the present invention I have found that aromatic o-dinitriles in a suitable diluent or solvent such as nitrobenzene, can be reacted with cupric sulfate and ammonia. The yields of unchlorinated pigment are high and the reaction mixture is not very corrosive so that much cheaper materials of construction may be used for the plant such as, for example, ordinary stainless steel.

I do not wish to limit the present invention strictly to any theory of action. I believe, however, that the ammonia is oxidized by sulfate ions in the reaction to nitrogen, the remainder of the ammonia reacting with the sulfuric acid thus produced to give ammonium sulfate. The reaction may be considered as following the equation:

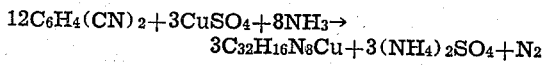

The present process uses ammonia to perform a dual function. First, to act as a reducing agent and second, to act as a base to react with the reduced anion set free in the reaction. This behavior of ammonia should not be confused with some prior processes for the production of phthalocyanine pigments in which ammonia has been employed to supply nitrogen entering into the molecule of the pigment itself, for example where an anhydride, amide or imide of an aromatic o-dicarboxylic acid is used in place of o-dinitrile, ammonia takes part in the reaction and at least a portion of it furnishes nitrogen atoms to form the phthalocyanine molecule itself. These processes are not technically efficient because of the poor yields and the ammonia does not behave as it does in the process of the present invention.

It has also been proposed to produce metal-free phthalocyanine pigments by heating an o-dinitrile in the presence of ammonia but in the absence of any copper compound. There, however, the ammonia does not and cannot perform any function of combined reducing and anion acceptance as is the case in the present invention where cupric sulfate is also present in the reaction.

Preferably, the process of the present invention is carried out in an inert organic diluent. The particular diluent is not critical and any inert or substantially inert organic solvent or diluent may be used. This is an advantage because the diluent can be chosen to fit economic conditions and it is not necessary to use the more expensive diluents or solvents, such as heterocyclic bases although they can be effectively employed in the present invention which is in no way limited to any particular solvent or diluent. Because of the above advantage, I prefer to use the cheap organic diluents among which nitrobenzene is very useful because it is not only cheap, but its boiling point corresponds closely to the preferred temperature of reaction and it can therefore be used effectively as an internal thermostat by causing it to boil gently. Other organic solvents such as di- or trichlorbenzene may be employed and it is an advantage of the present invention that the solvents are easily recovered because when the reaction is over the pigment formed is filtered off and washed with the solvent used. The solvent is then recovered from the mother liquor by stripping it off with steam, or by any other suitable method.

The present invention is applicable to the production of copper compounds of the phthalocyanine type from aromatic o-dinitriles generally in which the nitriles may be carbocyclic or heterocyclic. As examples of such nitriles, there may be mentioned, phthalonitrile, 3,4-dimethyl-phthalonitrile, 4-phenyl-phthalonitrile, 4-chloro-phthalonitrile, 4,5-dichlorophthalonitrile, 3-nitrophthalonitrile, 4-ethoxyphthalonitrile, 4-acetaminophthalonitrile, 3,4-dicyanobenzophenone, 2,3-dicyanofluorenone, 2,3-dicyanopyrazine, 2,3-dicyanodiphenylene oxide, 1,2-dicyanonaphthene, 6-methyl-2,3-dicyano-quinoxaline, 3,4-dicyano diphenyl, 2-(3',4' dicyanophenyl) benzothiazole, dicyano phenyl pyridines.

The temperature to be used in the present process is not critical. However, best results are obtained around 200° C., for example in a range between 180°–220° C. The reaction, however, proceeds at lower temperatures down to 120° C. and may be carried out at temperatures as high as 300° C. but in both cases the results become poorer as the temperature departs from the preferred range of 180–220° C.

The reaction medium should be substantially anhydrous. However, this is readily effected even when ordinary cupric sulfate in the form of a monohydrate is used, by passing a stream of ammonia through the reaction mixture at 100–110° C. before the temperature is raised to the desired reaction temperature. Dehydration takes place under such conditions and the temperature is low enough so that there is no material hydrolysis of the o-dinitrile.

The introduction of the ammonia may be carried out by passing ammonia through the reaction mixture and recovering it, or by recycling ammonia through the reaction mixture or the reaction may be carried out in the presence of an atmospheric of ammonia in an autoclave. All procedures give equally good results and the one chosen is the one determined by economic conditions.

The present invention while including broadly any cupric sulfate and any method of maintaining an excess of ammonia in the reaction mixture is not intended to claim specifically the feature of using an autoclave or of using anhydrous cupric sulfate which forms the subject matter of the copending application of King, Foote, and Felch, Serial No. 381,130 filed February 28, 1942.

I have found that the addition of small amounts of the corresponding imide has a beneficial effect in thinning out the charges and thus facilitating stirring. This permits using less diluent and increases the efficiency of the process. The amount of imide required to get this effect is not large and in the production of copper phthalocyanine it is sufficient to use a crude phthalonitrile which contains small amounts of phthalimide.

The yields obtained by the process of the present invention are excellent and approach theoretical even after the material has been purified by dissolving the pigment obtained in sulfuric acid and reprecipitating with water.

The present invention possesses numerous advantages over prior processes, or from another point of view, combines in a single process advantages which are obtained only singly in processes of the prior art. Among the advantageous results are excellent temperature control, sufficient fluidity to permit proper stirring, freedom from the production of chlorinated pigments, practically quantitative use of all of the copper put into the reaction mixture, a very cheap form in which the copper is used, and the possibility of using cheap solvents instead of expensive ones such as the pyridine bases or glycol. While all of these advantages have already been accomplished by my invention disclosed in my application Serial No. 299,262, this invention has the additional advantage that no corrosive action takes place and that the reactions may be carried out in stainless steel vessels.

The invention will be described in greater detail in conjunction with the following specific examples which are merely illustrative and are not in any way intended to limit the scope of the present invention to the details therein set forth. The parts in the examples are all by weight.

*Example 1*

411 parts of crude phthalonitrile (containing 385 parts of real phthalonitrile and 26 parts of phthalimide), 146 parts $CuSO_4.1H_2O$ and 30 parts ammonium sulfate are added to 1000 parts of nitrobenzene and the slurry heated to 100–105° C. The air is replaced with ammonia gas and the reaction mixture saturated with ammonia with rapid stirring. The temperature of the bath is raised to 225–230° C. in one-half hour and kept at this temperature for five hours in a slow stream of ammonia gas. The product is filtered hot and washed with methyl alcohol and hot water. The crude pigment is then dissolved in concentrated sulfuric acid and precipitated by pouring into cold water. The purified pigment is obtained in practically theoretical yield. The nitrobenzene may also be removed from the pigment in the above process by steam stripping instead of washing with alcohol.

*Example 2*

385 parts of purified phthalonitrile, 146 parts of $CuSO_4.1H_2O$, 30 parts of ammonium sulfate and 26 parts of phthalimide are added to 1000 parts of nitrobenzene and treated as in Example 1 above. The purified pigment is also obtained in excellent yield.

When this example is repeated but without any phthalimide, the reaction mass is more viscous, but the yield of purified product is the same as that above.

When Example 2 is repeated without the addition of any ammonia gas, an impure pigment is formed. When this is purified, a yield equal to only approximately one third of the theoretical yield is obtained.

*Example 3*

302 parts of crude phthalonitrile (containing 288 parts real phthalonitrile and 14 parts of phthalimide), 7.5 parts phthalimide and 91 parts of anhydrous $CuSO_4$ are added to 1000 parts of nitrobenzene in an autoclave. The autoclave is first evacuated and then 65 parts of dry ammonia gas are added. The reaction mixture is heated rapidly with stirring to 210–215° C. and held at that temperature for two hours. The maximum pressure developed is 450#/sq. in. at 210° C. and the final pressure is 390#/sq. in. The gases from the autoclave were analyzed and found to contain approximately the theoretical amounts of nitrogen and ammonia (excess).

The charge is then filtered hot and the nitrobenzene is recovered from the filter cake by steam distillation. The pigment is again filtered and washed with hot water. The filtrate contains ammonium sulfate and a small amount of copper salts. The crude pigment is then purified as usual by dissolving in concentrated $H_2SO_4$ and precipitating in water. The yield of purified pigment is practically equal to the theoretical yield.

When 166 parts of the anhydrous double salt $CuSO_4(NH_4)_2SO_4$ are substituted for the 91 parts of the anhydrous $CuSO_4$ in the above example, a pigment of equal quality and approximately the same yield is obtained.

*Example 4*

53 parts of 1,2-dicyanonaphthalene, 13 parts of anhydrous $CuSO_4$ and 2 parts of phthalimide are slurried in 100 parts of nitrobenzene and saturated with ammonia gas. The reaction mixture is then heated rapidly to the reflux temperature with stirring in an ammonia atmosphere and kept at this temperature for 5 hours. The product is filtered hot and washed with methyl alcohol and hot water. The dry pigment is purified by dissolving in concentrated sulfuric acid and precipitating in water. An olive green pigment is obtained in good yield.

*Example 5*

59 parts of 6-methyl-2,3-dicyanoquinoxaline are used in place of the 53 parts of 1,2-dicyanonaphthalene in Example 4. The product is worked up as in Example 4 and a dark green pigment is obtained in good yield.

What I claim is:

1. A method of producing a pigment of the copper phthalocyanine type which comprises reacting an aromatic o-dinitrile in the substantial absence of water with cupric sulfate in the presence of a practically inert organic diluent liquid at reaction temperature and in the presence of at least sufficient ammonia to combine with the sulfate anion set free in the reaction to produce ammonium sulfate and nitrogen.

2. A method of producing copper phthalocyanine which comprises reacting phthalonitrile in the substantial absence of water with cupric sulfate in the presence of a practically inert organic diluent liquid at reaction temperature and in the presence of at least sufficient ammonia to combine with the sulfate anion set free in the reaction to produce ammonium sulfate and nitrogen.

3. A method of producing a pigment of the copper phthalocyanine type which comprises reacting at 180°-220° C. an aromatic o-dinitrile in the substantial absence of water with cupric sulfate in the presence of a practically inert organic diluent liquid at reaction temperature and in the presence of at least sufficient ammonia to combine with the sulfate anion set free in the reaction to produce ammonium sulfate and nitrogen.

4. A method of producing copper phthalocyanine which comprises reacting at 180-220° C. phthalonitrile in the substantial absence of water with cupric sulfate in the presence of a practically inert organic diluent liquid at reaction temperature and in the presence of at least sufficient ammonia to combine with the sulfate anion set free in the reaction to produce ammonium sulfate and nitrogen.

5. A method of producing a pigment of the copper phthalocyanine type which comprises reacting an aromatic o-dinitrile in the substantial absence of water with cupric sulfate in the presence of nitrobenzene and in the presence of at least sufficient ammonia to combine with the sulfate anion set free in the reaction to produce ammonium sulfate and nitrogen.

6. A method of producing copper phthalocyanine which comprises reacting phthalonitrile in the substantial absence of water with cupric sulfate in the presence of nitrobenzene and in the presence of at least sufficient ammonia to combine with the sulfate anion set free in the reaction to produce ammonium sulfate and nitrogen.

7. A method of producing a pigment of the copper phthalocyanine type which comprises reacting at 180-220° C. an aromatic o-dinitrile in the substantial absence of water with cupric sulfate in the presence of nitrobenzene and in the presence of at least sufficient ammonia to combine with the sulfate anion set free in the reaction to produce ammonium sulfate and nitrogen.

8. A method of producing copper phthalocyanine which comprises reacting at 180-220° C. phthalonitrile in the substantial absence of water with cupric sulfate in the presence of nitrobenzene and in the presence of at least sufficient ammonia to combine with the sulfate anion set free in the reaction to produce ammonium sulfate and nitrogen.

9. A method according to claim 2 in which sufficient phthalimide is present to reduce the viscosity of the reaction mixture.

HAROLD TALBOT LACEY.